(12) United States Patent
Close et al.

(10) Patent No.: US 6,536,495 B1
(45) Date of Patent: Mar. 25, 2003

(54) TREAD STIFFENING FOR TWO PLY RUNFLAT TIRE

(75) Inventors: Roland Close, Burg-Reuland (BE); Agnes Nathalie Iwana Verbeke-Ensch, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/762,961

(22) PCT Filed: Nov. 2, 1998

(86) PCT No.: PCT/US98/23318
§ 371 (c)(1),
(2), (4) Date: Feb. 13, 2001

(87) PCT Pub. No.: WO00/26045
PCT Pub. Date: May 11, 2000

(51) Int. Cl.[7] .......................... B60C 17/00; B60C 17/08; B60C 09/13
(52) U.S. Cl. ...................... 152/517; 152/548; 152/550; 152/552; 152/557
(58) Field of Search ................................. 152/550, 552, 152/517, 557, 548, 560, 554

(56) References Cited

U.S. PATENT DOCUMENTS

| 3,040,383 A | * | 6/1962 | Nassimbene ................ 156/123 |
| 4,111,249 A | | 9/1978 | Markow |
| 5,368,082 A | | 11/1994 | Oare et al. |
| 5,427,166 A | * | 6/1995 | Willard, Jr. ................ 152/454 |
| 5,511,599 A | | 4/1996 | Willard, Jr. |
| 5,871,600 A | | 2/1999 | Oare et al. |
| 6,142,205 A | * | 11/2000 | Beck et al. ................ 152/517 |

FOREIGN PATENT DOCUMENTS

| EP | 0364710 | 4/1990 |
| EP | 04752580427258 | 3/1992 |
| JP | 09-188112 | * 7/1997 |
| WO | WO94/18015 | 8/1994 |

* cited by examiner

*Primary Examiner*—Michael W. Ball
*Assistant Examiner*—Justin Fischer
(74) *Attorney, Agent, or Firm*—Howard M. Cohn (57) ABSTRACT

A two-ply radial runflat tire having a belt structure, a ply structure, two inextensible beads and two wedge-insert reinforced sidewalls. The outer ply is reinforced by high-modulus, light-weight aramid. The aramid reinforcement material of the outer ply is clamped around the beads. The outer ply is prestressed in tension during manufacture of the tire. The resultant tire is light in weight and resists upward buckling of the tread during runflat operation.

3 Claims, 5 Drawing Sheets

TREAD STIFFENING FOR TWO PLY RUNFLAT TIRE

TECHNICAL FIELD

The present invention relates to the design of two-ply pneumatic radial ply runflat passenger tires.

BACKGROUND OF THE INVENTION

Various methods have been devised for enabling the safe continued operation of unpressurized or underpressurized vehicle tires with the intent of minimizing further damage to the uninflated tire and without simultaneously compromising vehicle handling over a distance from the place where the tire has lost its pressure to a place desired by the driver, such as a service station, where the tire can be changed. Loss of tire pressure can result from a variety of causes, including puncture by an object such as a nail or other sharp object.

Pneumatic tires designed for sustained operation under conditions of unpressurization or underpressurization are also called runflat tires, as they are capable of being driven in the uninflated, or what would generally be called "flat," condition. The conventional pneumatic tire collapses upon itself when it is uninflated and is carrying the weight of a vehicle. The tire's sidewalls buckle outward in the portion of the tire where the tread contacts the ground, making the tire "flat," at least in that ground-contacting region.

The term "runflat" is generally used to describe a tire that is designed such that the tire structure alone, in particular the sidewalls, has sufficient rigidity and strength to support the vehicle load when the tire is operated without being inflated. The sidewalls and internal surfaces of the tire do not collapse or buckle onto themselves, and the tire does not otherwise contain or use other supporting structures or devices to prevent the tire from collapsing.

An early example of a runflat tire design is described in U.S. Pat. No. 4,111,249, entitled the "Banded Tire," in which a hoop or annular band approximately as wide as the tread is circumferentially deployed beneath the tread. The hoop in combination with the rest of the tire structure could support the vehicle weight in the uninflated condition.

Another approach taken has been simply to strengthen the sidewalls by increasing their cross-sectional thickness so as to resist the bending that takes place in the portions of the sidewalls that are adjacent to the ground-contacting portion of the tread. However, due to the large amounts of rubber required to stiffen the sidewall members, flexure heating becomes a major factor in tire failure during runflat operation, especially when the uninflated tire is operated at high speeds. Pirelli discloses such a runflat tire design in European Pat. Pub. No. 0-475-258A1.

In general, runflat tires incorporate sidewalls that are thicker and/or stiffer than typical non-runflat tires so that the tire's load can be carried by an uninflated tire with minimum adverse effects upon the tire itself and upon vehicle handling until such reasonable time as the tire can be repaired or replaced. The typical methods used in sidewall thickening and stiffening include the incorporation of circumferentially disposed wedge inserts in the inner peripheral surface of the sidewall portion of the carcass, which is the region in the tire usually having the lowest resistance to deformation under vertical loading. In such runflat tire designs, each sidewall is thickened in such a way that its overall thickness, in the region between the bead and the tread shoulder, is on the order of the thickness of the tread regions of the tire.

The reinforced sidewalls of such tires, when operated in the uninflated condition, experience a net compressive load in the region of the sidewall closest to the road-contacting portion of the tread. Also, the bending stresses on the reinforced sidewalls are such that, during runflat operation, the outer portions of the sidewalls experience tensile forces while the inner portions experience compression stresses.

A Goodyear patent U.S. Pat. No. 5,368,082, by Oare et al ('082), disclosed a low aspect runflat, pneumatic radial ply tire which employs special sidewall inserts to improve stiffness. Approximately six additional pounds of weight per tire was required to support an 800 lb load in this uninflated tire. This earlier invention, although superior to prior attempts at runflat tire design, still imposed a weight penalty that could be offset by the elimination of a spare tire and the tire jack. However, this weight penalty becomes even more problematic in the design of tires having higher aspect ratios.

Two U.S. Pat. Nos. 5,427,166 and 5,511,599 of Walter L. Willard, Jr., show Michelin tires that disclose the addition of a third ply and the addition of a third insert in the sidewall to further increase the runflat performance of the tire over that of the '082 patent. These two later patents discuss some of the load relations that occur in the uninflated condition of the tire and they demonstrate that the concept set out in the '082 patent can be applied to additional numbers of plies and inserts.

In general, runflat tire design is predicated upon the use of reinforcing wedge inserts inside each sidewall flex area. The wedge inserts in each sidewall, in combination with the plies, add rigidity to the sidewalls in the absence of air pressure during runflat operation. The '082 patent teaches a sidewall construction for runflat tires in which the tire is constructed with two plies, an inner liner and two reinforcing wedge inserts in each sidewall. The two inserts in each sidewall are disposed such that one insert is located between the two plies while the other insert is located between the inner liner and the first or innermost ply.

While the high resistance to compression deflection of the inserts provides the necessary resistance to the collapse of the uninflated loaded tire, the use of multiple plies and, in each sidewall, more than one reinforcing wedge insert has drawbacks which include the above mentioned increase in tire weight and cyclical-flexure-induced heating. Such designs also increase the tire's complexity in ways that adversely affect manufacturing and quality control.

Clearly, the goal in runflat tire design is to provide a low-cost, light-weight tire that gives good runflat vehicle handling as well as good service life during runflat operation.

OBJECTS OF THE INVENTION

It is an object of the present invention to provide a runflat radial tire as defined in one or more of the appended claims and, as such, having the capability of being constructed to accomplish one or more of the following subsidiary objects.

One object of the present invention is to provide a runflat tire having a tread that resists upward buckling during runflat operation.

Another object of the present invention is to provide a runflat tire that is of light-weight construction.

Still another object of the present invention is to provide a runflat radial tire having sidewalls that resist deformation in the region of ground contact during uninflated operation.

Yet another object of the present invention is to provide a runflat radial tire having a ply structure in which the outermost ply is reinforced with a light-weight, high-modulus material, specifically aramid.

Another object of the present invention is to have the aramid-reinforced, outermost ply clamped to the bead structures.

A further object of the present invention is to prestress in tension, during the manufacturing process, the aramid-reinforced outermost ply.

A yet further object of the present invention is to provide a runflat tire having good full-inflated handling characteristics as well as good runflat handling properties and runflat operational life.

Still another object of the present invention is to apply the inventive concept to a variety of alternative tire designs.

SUMMARY OF THE INVENTION

The present invention relates to a pneumatic radial ply runflat tire having a tread, a carcass comprising a radial ply structure, a belt structure located between the tread and the radial ply structure, two inextensible beads, and two sidewalls, each of which is reinforced by wedge inserts. The ply structure comprises an inner ply and an outer ply. The outer ply is reinforced with aramid, a material having low density and high modulus of elasticity. The outer ply is clamped around the beads and prestressed in tension during manufacture of the tire.

BRIEF DESCRIPTION OF THE DRAWINGS

The structure, operation, and advantages of the invention will become further apparent upon consideration of the following description taken in conjunction with the accompanying drawings, wherein.

DEFINITIONS

"Apex" means an elastomeric filler located radially above the bead core and between the plies and the turnup plies.

"Aspect Ratio" means the ratio of the section height of a tire to its section width; also refers to the cross-sectional profile of the tire; a low-profile tire, for example, has a low aspect ratio.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" or "Belt Package" means at least two annular layers or plies of parallel cords, woven or unwoven, underlying the tread, unanchored to the bead, and having both left and right cord angles in the range from 18° to 30° relative to the equatorial plane of the tire.

"Breakers" or "Tire Breakers" means the same as belt or belt structure or reinforcement belts.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "Tire Crown" means the tread, tread shoulders and the immediately adjacent portions of the sidewalls.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface at zero speed and under normal load and pressure.

"Gauge" refers to thickness.

"Inner Liner" means the layer or layers of elastomer or other material that form the inside surface of a tubeless tire and that contain the inflating fluid within the tire.

"Insert" or "wedge insert" means the crescent- or wedge-shaped reinforcement typically used to reinforce the sidewalls of runflat-type tires; it also refers to the elastomeric non-crescent-shaped insert that underlies the tread.

"Lateral" means a direction parallel to the axial direction.

"Meridion" or "meridional" refers to the direction that runs radially outward from one tire bead, across the tread (parallel to the axial direction) and radially inward to the other tire bead. Cross-sectional views of tires are generally meridional sections.

"Normal Inflation Pressure" means the specific design inflation pressure at a specified load assigned by the appropriate standards organization for the service condition for the tire.

"Normal Load" means the specific design inflation pressure and load assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "Tangentially" refer to segments of circular curves that intersect at a point through which can be drawn a single line that is mutually tangent to both circular segments.

"Toe guard" refers to the circumferentialy deployed elastomeric rim-contacting portion of the tire axially inward of each bead.

"Tread Cap" refers to the tread and the underlying material into which the tread pattern is molded.

"Tread Contour" means the shape of a tire tread as viewed in axial cross section.

"Tread width" means the arc length of the tread surface in the plane includes the axis of rotation of the tire.

"Wedge Insert" means the same as "Insert."

DETAILED DESCRIPTION OF THE PREFERRED EMBODIMENT

Prior Art Embodiment

Figure 1:
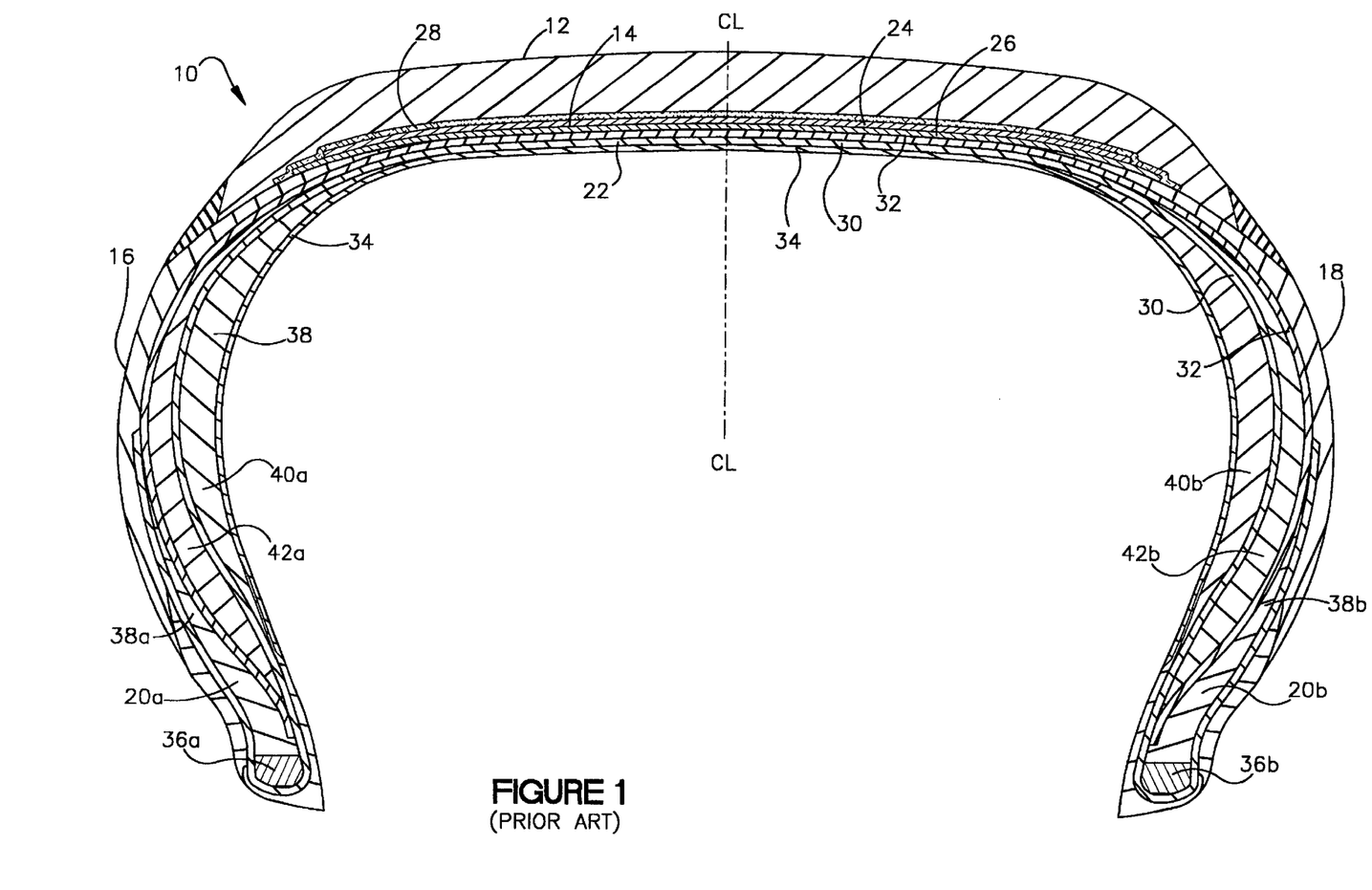
FIG. 1 is a cross-sectional view of a prior art runflat tire design incorporating multiple wedge inserts in each sidewall and multiple plies in the ply structure.

With reference to FIG. 1, a meridional cross section of a typical prior art pneumatic radial runflat tire 10 is illustrated. The tire 10 shown in FIG. 1 is of intermediate aspect ratio. It has a tread 12, a belt structure 14 comprising belts 24,26, a pair of sidewall portions 16,18, a pair of bead regions 20a,20b, a carcass structure 22, and a fabric overlay 28 deployed between the bottom portion of tread cap 12 and the upper parts of the belt structure. The carcass 22 comprises a first ply 30 and second ply 32, a gas-impervious inner liner 34, a pair of beads 36a,36b, a pair of bead filler apexes 38a,38b, a first pair of sidewall wedge inserts 40a,40b, and a second pair of inserts 42a,42b. The first or innermost wedge insert 40a,40b is located between the inner liner 34 and the first ply 30, and the second wedge insert 42a,42b is located between the first ply 30 and second ply 32. The fabric overlay 28 is disposed beneath, or radially inward of, tread cap 12 and on top of, or radially outward from, belt structure 14. The reinforced sidewall portions 16,18 of carcass structure 22 give the tire 10 a limited runflat capability.

The structural reinforcement in the sidewall area of the tire 10 substantially increases the overall thickness of the sidewall portions 16,18. This generalized prior art runflat tire design shows the more or less uniformly thickened sidewalls that characterize runflat tire designs. The insert-reinforced sidewalls are necessary to support the tire's load with minimal sidewall deflection when the tire 10 is uninflated. Such runflat tire designs provide good vehicle handling and performance during full-inflated operation, and they yield acceptable runflat vehicle handling and runflat operational life when the tire is uninflated. Runflat tires generally weigh more than equivalent non-runflat-capable tires, and their greater structural complexity results in time consuming manufacturing and quality control.

Figure 2A:
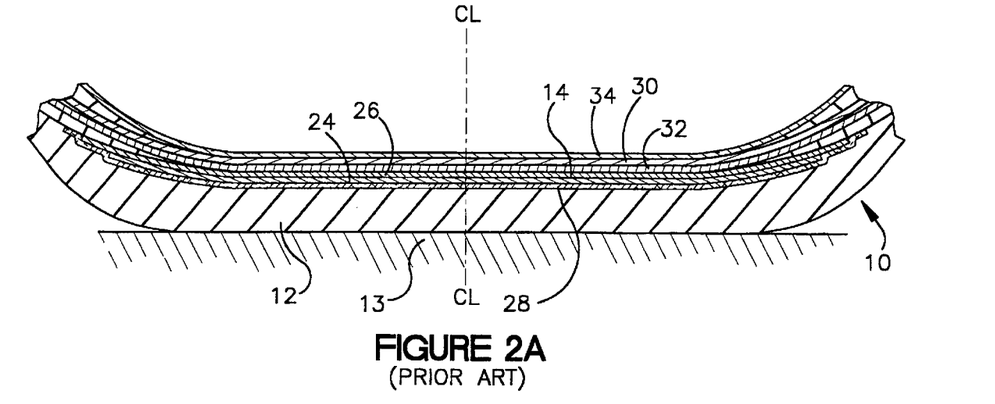
FIG. 2A is a cross-sectional view of the ground-contacting portion of the tread of a prior art tire.

FIG. 2A shows a fragmentary schematic of a normally inflated prior art tire with its tread 12 in contact with the ground 13. The flattening of the tread 12, in the region where it contacts the ground 13, induces bending stresses in the tread and its underlying components, including belt structure 14, fabric overlay 28, belts 24,26, radial plies 30,32, and inner liner 34. More specifically, the bending stesses derive from the flattening of the tread 12 from the as-molded and/or the as-inflated meridional curvature of tread and its underlying structures. These bending stresses induce tensile stresses in the radially inward structures beneath tread 12, such as the inner liner 34 and the radial plies 30,32. Corresponding compressive stresses are induced in the elastomeric material of tread 12 and such underlying structures as the fabric overlay 28 and portions of the belt structure 14.

Figure 2B:
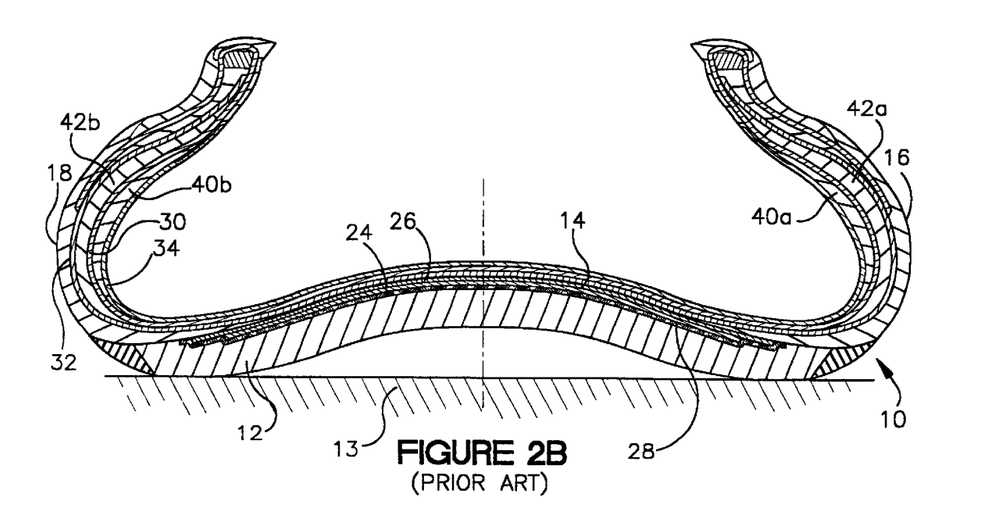
FIG. 2B is a meridional, cross-sectional view of a prior art runflat tire, showing the deformation of the sidewalls and tread in the ground-contacting portion of the uninflated tire.

FIG. 2B illustrates the bending of the sidewalls 16,18 of the prior art runflat tire 10 and the upward buckling of tread 12 in the region where the tread makes contact with the flat road surface 13. The upward buckling of the central tread region is one of the undesireable feature which the present invention addresses, because of the adverse affect it has on vehicle handling during runflat operation and the adverse effect it also has on the tire's runflat operational life. The upward buckling also corresponds to the formation of bending stresses in the central portions of tread 12 and its underlying (i.e., radially inward) structures. The bending stresses in the tread 12 during runflat operation, as illustrated in FIG. 2B, are greater than those associated with simple flattening of the tread during normal-inflated operation as illustrated in FIG. 2A.

Figure 3A:
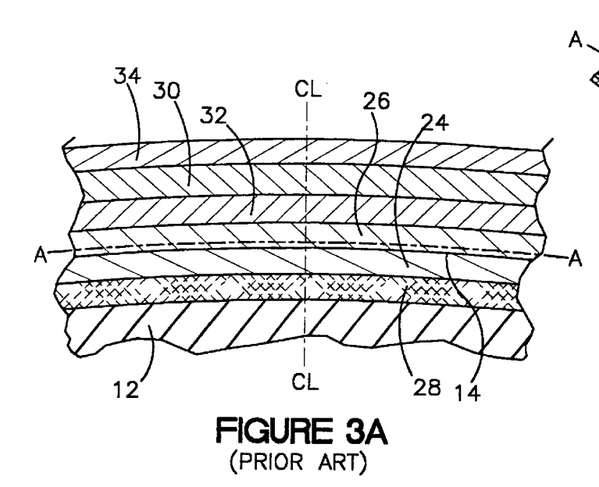
FIG. 3A illustrates the location of the neutral bending axis in the central portion of the upward buckled tread of the uninflated prior art tire.

FIG. 3A is a fragmentary, cross-sectional detail (not in dimensional proportion) of the belts 24,26, plies 30,32, inner liner 34 and fabric overlay 28 as they would appear within the upward-buckled central portion of the tread region of the prior art tire 10 as it is shown in FIG. 2B. The neutral bending axis A—A shown in FIG. 3A is located near the interface area between belts 24,26, which location has been chosen arbitrarily, but with engineering judgment, for the sake of explaining the present invention in relation to the prior art. Those skilled in the art will appreciate that, in FIG. 3A, the structural elements of tread 12 which lie above the neutral axis A—A—i.e., radially inward of the tread 12—will experience tensile loading, while those structures located below the neutral axis A—A, i.e., closer to tread 12, will experience compressive loading. The location of neutral axis A—A in relation to belts 24,26 is approximate, taking into account the tensile-stress-bearing capabilities of radial plies 30,32 and the tensile- and compressive-stress-bearing capabilities of the belts 24,26. The fabric overlay 28 is not a compressive-load-bearing structure, nor is the inner liner 34 an effective tensile-load-bearing structure. The neutral axis A—A is shown to be located within belt structure 14 purely as an approximation of where it would lie given the relative greater modulus of elasticity of the steel reinforcing cords in belts 24,26 compared to the modulus of the cords that reinforce the plies 30,32 of the prior art tire. It should be apparent to those skilled in the art that the incorporation, in the region above the neutral being axis A—A in FIG. 3A, of tensile bearing reinforcing elements having a high tensile modulus of elasticity will contribute an overall greater resistance to the amount upward buckling of the tread during runflat operation. That is, the stiffness of the crown area will be increased by the addition of high-modulus structural elements in the regions where tensile stresses are encountered. A significant result of the incorporation of high-modulus tensile-stress-bearing reinforcements would be a translation of the neutral bending axis A—A toward the member thus reinforced. More specifically, if the second ply 32 of the prior art tire were to be made of a hypothetical high-modulus material, then the neutral axis A—A would move to a location such as the one shown in FIG. 3B.

Figure 3B:
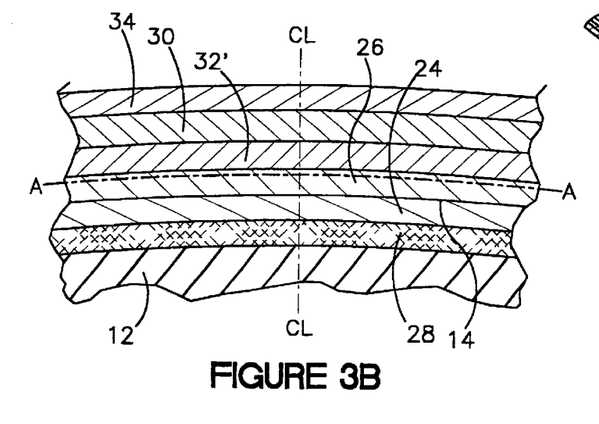
FIG. 3B illustrates the location of the neutral bending axis in the central portion of the upward buckled tread of the uninflated prior art tire having a hypothetical high-modulus outer ply.

The significance of the change in location of the neutral bending axis A—A will be discussed in more detail further below.

The Present Invention

Figure 4:
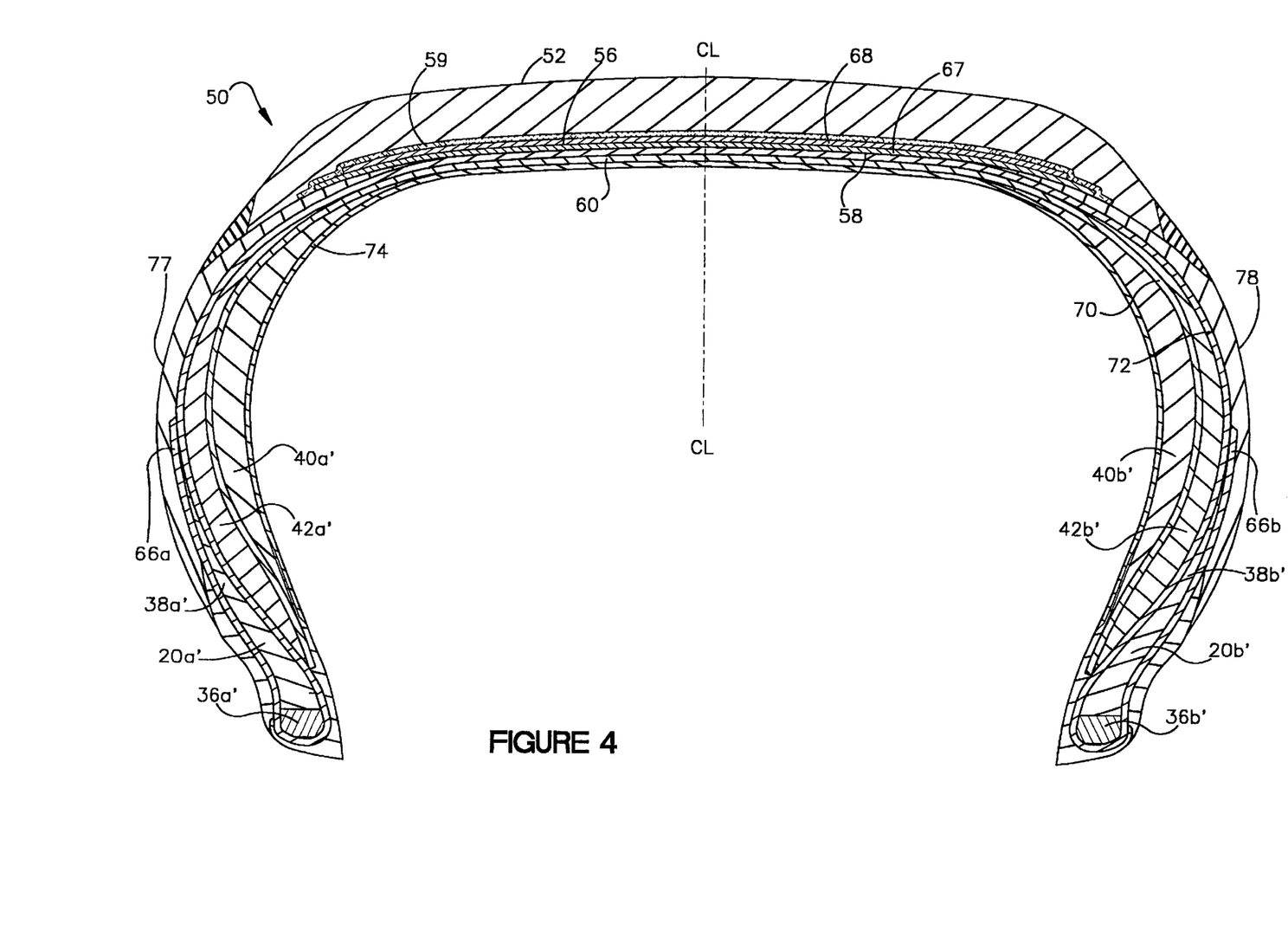
FIG. 4 is a meridional cross-sectional view of the tire of the present invention.

FIG. 4 shows a meridional cross-sectional view of a runflat tire 50 according to the present invention. The tire 50 shown is of intermediate aspect ratio. It has a tread 52, a belt structure 56 comprising belts 67,68, a pair of sidewall portions 77,78, a pair of bead regions 20a',20b', a carcass structure 60, and a fabric overlay 59 deployed between the bottom portion of tread 52 and the upper parts, or radially outward-most portion, of the belt structure. The carcass 60 comprises a first ply 70 and second ply 72, a gas-impervious inner liner 74, a pair of beads 36a',36b', a pair of bead filler apexes 38a',38b', a first pair of sidewall wedge inserts 40a',40b', and a second pair of inserts 42a',42b'. Each of the first or innermost wedge inserts 40a',40b' is located between the inner liner 74 and the first ply 70, and each of the second wedge inserts 42a',42b' is located between the first ply 70 and second ply 72. (Throughout the specification, primed and double primed numbers represent structural elements which are substantially identical to structural elements represented by the same unprimed number.)

The practice of the inventive concept will become evident in the description below, wherein the use of aramid as the reinforcing material of the second or outermost ply 72 of the present invention is described.

Aramid Reinforced Second Ply Aramid is an aromatic polyamide compound e.g. PPTA: poly (p-phenylene terephthalamide) having the following properties which are shown in comparision to rayon, steel and E-glass.

|  | Aramid | Rayon | Steel | E-Glass |
| --- | --- | --- | --- | --- |
| Modulus of Elasticity (GPa) | 80 | 18 | 210 | 73 |
| Specific Gravity | 1.45 | 1.53 | 7.85 | 2.58 |

Notice that aramid has a resistance to tensile-stress-induced strain, i.e., it has a high modulus of elasticity. It also has a low specific gravity, or density. More specifically, aramid has more than four times the elastic modulus of rayon and a comparable specific gravity. Steel has a higher modulus of elasticity than aramid, but steel is also denser, which would act to increase the weight of the tire. Aramid is lighter than glass reinforcing material, but has a comparable modulus.

Thus one of the inventive feature of the present invention is the use of aramid reinforcing cords in the second or outermost ply 72. Another inventive feature is the clamping or anchoring of the ply 72 around the beads 36a',36b' resulting in the turnup ends 66a,66b, as shown in FIG. 4. Thus ply 72 is clamped around the beads as shown in FIG. 4, while the radial ply 70 is a "floating" ply, i.e., terminating without going around the bead 36a',36b'. (While FIG. 4 shows the aramid ply 72 as being clamped or wrapped around the beads in such a way that turnup ends 66a,66b are located axially outward of the ply 72, i.e., the ply 72 wraps around each bead from the axially inward side of each bead toward the axially outward side, the direction of wrapping or clamping of the ply 72 around the beads could as well be in the opposite direction.) Clamping of the ply 72 to the beads increases the ability of the aramid reinforcing material to resist deformation when it is exposed to the tensile stresses associated with runflat operation.

The present invention further contemplates the manufacture of the tire 50 in such as way as to induce tensile prestressing of the outer ply 72, thereby further increasing the tire's rigidity and resistance to deformation during runflat operation. Such prestressing can be induced during manufacturing and molding of the tire according to methods that are well-known to those skilled in the art. The clamping of the second ply 72 around the bead structures 36a',36b' aids in the induction of tensile prestressing of the aramid reinforcing cords of the second ply during the manufacturing process.

Origins and Effects of Tensile Stresses During Runflat Operation

During runflat operation, tensile stresses in the second or outer ply of runflat tires derive from dynamical factors that become apparent upon contemplation of FIGS. 3A and 3B. FIGS. 3A and 3B each show in close-up view the central tread sections of the prior art tire 10, as it is shown more fully in meridional cross section in FIG. 2B. FIG. 3A shows the location of the neutral bending axis A—A in the buckled tread region of an uninflated prior art runflat tire in the regions of the tire adjacent to where the center of the tread buckles upward from the ground, as has been described above. (The location of the neutral bending axis is an estimated approximate location, made here for the sake of illutration only; it is not intended to reflect the results of calculations nor is it a product of actual measurements.) To reiterate, the deformed portions of the tire that lie upward of the neutral bending axis A—A (in FIG. 3A) experience tensile stresses, while those below the neutral bending axis, such as most of the belt structure 14 and all of the tread 12, experience compressive stresses.

FIG. 3B is the same as FIG. 3A except that the outer ply 32' is reinforced with a hypothetical material having a substantially higher modulus of elasticity than the corresponding ply 32 shown in FIG. 3A. Accordingly, in FIG. 3B, the neutral bending axis A—A is shown being closer to the ply 32', as would be expected when one element of a structural member is increased in its modulus of elasticity. This effect can be understood in reference to an I-beam analogy that is illustrated in FIGS. 5A and 5B, which help explain the means by which the incorporation of a single high-modulus element can increase the bending modulus of entire structural member, such as the tread and sidewalls of tires.

Figure 5A:
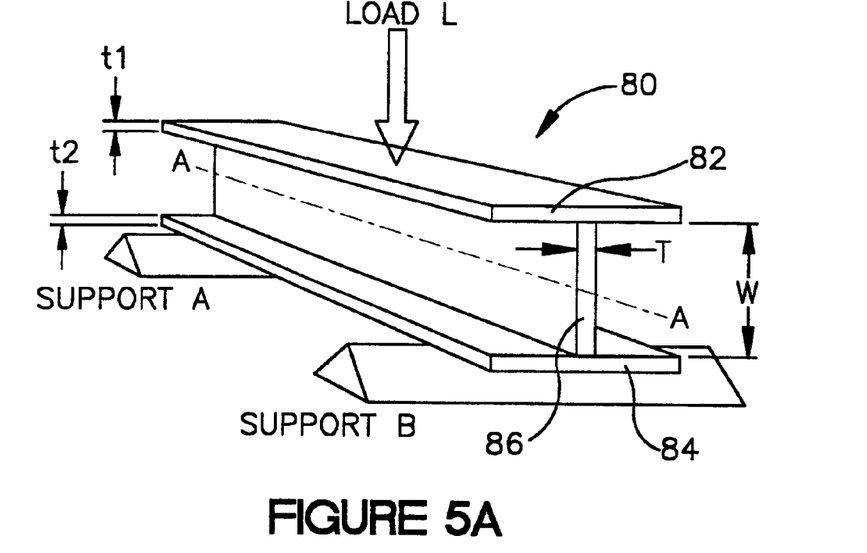
FIG. 5A shows an I-beam which demonstrates the principles of neutral bending axis and bending moment of inertia.

FIG. 5A shows an I-beam 80 comprising a web portion 86 and two flanges 82,84 separated by the web portion. The I-beam 80 is supported on supports A and B, and it carries load L, located approximately in the center of the beam. Those skilled in the art will readily recognize that the lower flange 84 will experience tensile loading, while the upper flange 82 will undergo compressive loading. The neutral bending axis A—A shown in FIG. 5A is located along the center of the web 86. This central location of the neutral bending axis is due to the cross-sectional symmetry of the beam 80 and, for the sake of the simplicity of this example, an assumed isotropy of the material of the I-beam. The thickness t1 of the flange 82 is equal to the thickness t2 of the flange 84.

While it is apparent that the I-beam of FIG. 5A will be deflected downward under the force of any load L, including the force of the beam's own weight, the degree of deflection can be reduced—that is, the beam can be stiffened against deflection—by several methods. One method by which to increase the resistance of the I-beam 80 to deflection is by increasing the width W of the web 86. Another method is to increase the thickness (t1,t2) of one or both of the flanges 82,84. And yet another method is to make the I-beam of a material having a high-modulus of elasticity.

Figure 5B:
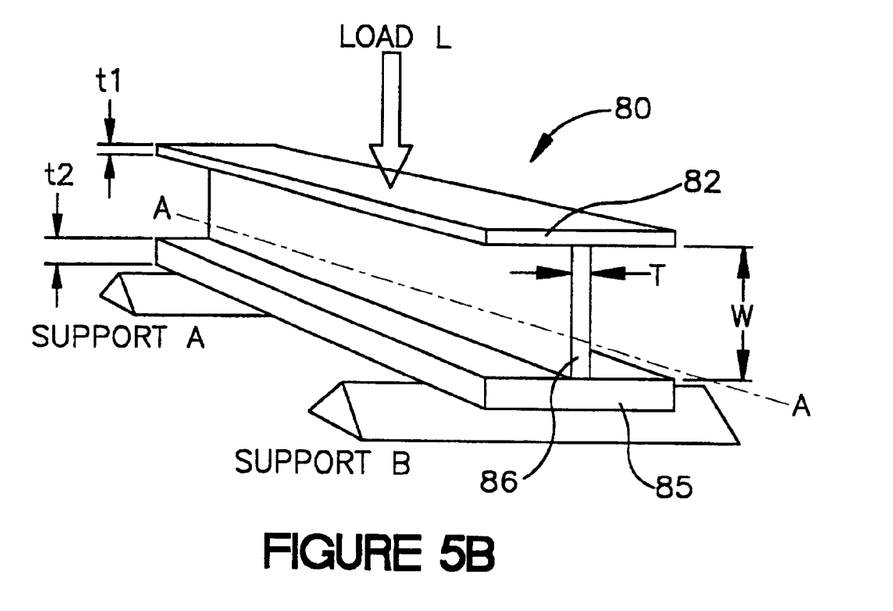
FIG. 5B shows an I-beam which demonstrates the change in location of the neutral bending axis when one of the beam's elements is increased in rigidity.

FIG. 5B shows essentially the same I-beam as that shown in FIG. 5A, except that the thickness t2 of the lower flange 85 is greater than the thickness t1 of the upper flange 82. The relationship of the I-beam analogy is such that FIG. 5A corresponds to FIG. 3A, while FIG. 5B, with the thicker lower flange 85, corresponds to FIG. 3B. In FIG. 5B, the location of the neutral bending axis is displaced downward from the central location shown in FIG. 5A wherein the I-beam has a horizontally symetrical cross-section. In FIG. 5B, the new location of the neutral bending axis A—A reflects the increased tensile-stress-bearing capacity of the lower flange 85 that has the greater thickness t2. In other words, flange 85, being thicker and thus better able to resist tensile deformation, can exert more force with respect to the moment arm that is defined by the distance between the centroid of the flange 85 and the neutral bending axis. Correspondingly, the induced downward translation of the neutral bending axis (i.e., the translation of the neutral bending axis as shown in FIG. 5A versus its location in FIG. 5B) also gives a rigidifying benefit to the upper flange 82 in resisting compressive stresses; that is, the centroid of flange 82, which is otherwise the same as in FIG. 5A, has, as shown in FIG. 5B, an increased moment arm with respect to the greater distance between the flange 82 and the neutral bending axis. Thus, FIGS. 5A and 5B demonstrate that the thickening of a single element (i.e., the thicker flange 85, in FIG. 5B) increases the bending moment of inertia, and thus the corresponding bending modulus, of the entire structural member 80. In other words, the beam 80, as shown in FIG. 5B with a thicker tensile-stress-bearing flange 85, deforms less under the force of a given load L than would the corresponding beam shown in FIG. 5A.

Referring again to FIGS. 3A and 3B, the latter, by virtue of the hypothetical ply 32', which is reinforced with an unspecified high-modulus material, confers upon the entire tire cross-section a greater resistance to bending than is available in the corresponding member shown in FIG. 3A.

Figure 3C:
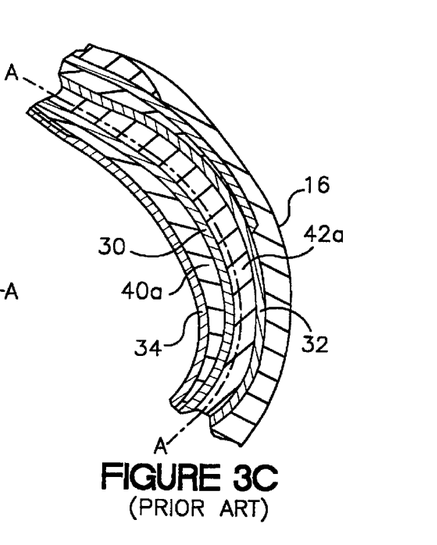
FIG. 3C illustrates the location of the neutral bending axis in one sidewall of an uninflated prior art tire.
Figure 3D:
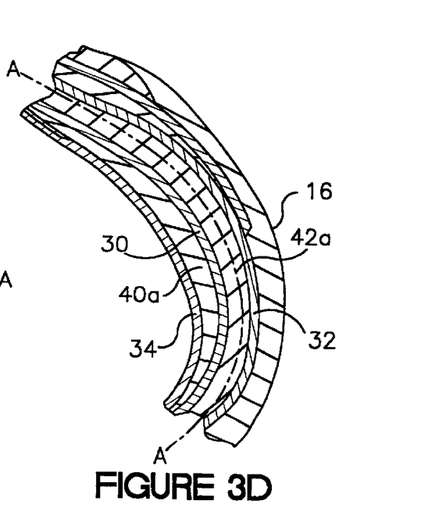
FIG. 3D illustrates the location of the neutral bending axis in one sidewall of an uninflated prior art tire having a hypothetical high-modulus outer ply.

Referring to FIG. 4, the aramid reinforced ply 72 confers upon the tire 50 the property of increased resistance to flexure of the sidewalls and the tread, as described above in reference to FIGS. 3A, 3B, 5A, and 5B. As for the sidewalls, FIGS. 3C and 3D show the corresponding translation of the neutral bending axis A—A within the sidewall members of the prior art tire wherein a hypothetical high-modulus reinforcement is incorporated into the radial ply 32'. FIG. 3C shows the deformed sidewall 16 of the uninflated prior art tire (which is shown more generally in FIG. 2B). FIG. 3D shows the hypothetical prior art sidewall 16 where in the ply 32' is reinforced by an unspecified high modulus material. In FIG. 3D, the neutral bending axis A—A has undergone a translational relocation bringing it closer to the outer ply 32' that is reinforced by a hypothetical high-modulus material.

Thus becomes clear the action of the aramid reinforced ply 72 of the present invention, as shown in FIG. 4.

Clamping of the Aramid Ply

Referring to FIG. 4, the turnup ends 66a,66b correspond to the clamping or anchoring of the tensile-stress-loaded aramid reinforced ply 72 with respect to the beads 36a',36b'. No corresponding anchoring or clamping (around the beads) of the first or inner ply 70 is needed because this first ply experiences compressive loading during runflat operation, and the bulk of that compressive loading is supported by the wedge inserts 40a',40b',42a', and 42b'. The clamping of the second ply 72 around the beads is additionally useful during the tire manufacturing process during which the ply 72 becomes prestressed in tension, which prestressing further enhances the ability of the tread 52 and the sidewalls 77,78 to resist bending deformation, that is, to have an overall increased bending modulus of rigidity. As stated above, such prestressing can be induced during manufacturing and molding of the tire according to methods that are well-known to those skilled in the art.

The amount of tensile prestressing of the high-modulus outer ply 72 is intended to be in the range of between about 20 GPa and about 80 GPa, and most preferably in the range of between about 25 GPa and about 40 GPa.

Operational Dynamics of the Inventive Concept

Thus the tire 50 of the present invention has a tread region 52 and sidewall portions 77,78 that have greater overall resistance to flexure during runflat operation than does the prior art tire 10. The use of aramid reinforcement in the outer ply 72 of the tire 50 of the present invention thus enhances the resistance of the tread 52 to upward buckling during runflat operation by means of two mechanisms: (1) the sidewalls 77,78 are stiffer and are thus less prone to deformation during runflat operation, which thereby reduces the tread-lifting torsional forces that would otherwise be transmitted to the tread 52 during runflat operation, and (2) the tread 52 is itself afforded a greater overall bending modulus and resistance to upward buckling during runflat operation.

An additional benefit of the present invention is improved runflat tread contact with the road, which contributes both to improved runflat handling and runflat operational life (due to smaller magnitudes of cyclical flexure and the heating associated therewith). Another benefit is that the enhanced bending modulus of the sidewalls makes them better able to resist runflat deformation and thus decreases in the deformational magnitude of the cyclical flexure of the sidewalls, which contributes both to improved runflat vehicle handling and to improved runflat operational service life of the sidewall portions 77,78. Yet another benefit of the present invention is that the tire 50 is lighter in overall weight than would be a tire in which the outer ply is reinforced with such high modulus but dense material as metal.

In overall result, the high modulus reinforcing cords of ply 72 in FIG. 4 work to increase the bending modulus of the sidewalls 77,78 and the tread 52 of the tire 50 of the present invention. In other words, the use of aramid reinforcing cords in the ply 72 (FIG. 4), which corresponds to the ply 32 in FIG. 3A, results in a reduction of the kind of deformation illustrated in the tread portion 12 and sidewall portions 16,18 shown in FIG. 2B.

More generally, the idea of using a material having a high tensile modulus of elasticity and a low specific gravity as a reinforcing material for the outermost ply 72 contemplates the use of any material having a tensile modulus of elasticity of at least 30 GPa and a specific gravity in the range of between about 1 and about 3. In this general regard, the desired physical properties of the other tire components, i.e., those related to runflat performance, need also to be taken into account. Of specific interest are the wedge inserts 40a,40b,42a and 42b, and the inner ply 70.

As has been explained above, the tensile-stress of outer ply 72 works in concert with the wedge inserts and, to a small extent, the inner ply 70, in such a way that the compression bearing parts of the tire must complement the properties of the tensile-stress-bearing high-modulus outer ply. More specifically, the compression moduli of elasticity of the wedge inserts 40a,40b,42a and 42b should be in the range of between about 2.0 MPa to about 4.8 MPa, and most preferably in the range of between about 3.5 MPa and about 4.5 MPa. As for the inner ply 70, its relative small cross-section makes its load-bearing area virtually insignificant as a compression-load-bearing structure. Nonetheless, the ranges of the pertinent physical properties of the inner ply 70 should be specified in the context of the present invention. Accordingly, the reinforcing material in the inner ply 70 is expected to have a tensile modulus of elasticity of between about 4 GPa and about 30 GPa, most preferably in the range of between about 6 GPa and about 12 GPa. The specific gravity of the reinforcing material of the inner ply 70 should be in the range of between about 1 and about 3, and most preferably not more than about 2.

Operational Testing

A two-ply runflat tire 50, built according to the present invention incorporated an inner ply that was reinforced with rayon and an outer ply that was reinforced with aramid. The tire was evaluated in a finite element analysis model, and it was also compared experimentally, in runflat handling tests, to a standard two-ply rayon reinforced runflat tire. The finite element analysis showed a reduction of the crown buckling for the aramid ply construction. During runflat handling tests, a deflated two ply all rayon reinforced tire was deployed in the right rear position and showed critical oversteer behaviour compared with the aramid reinforced tire according to the present invention which provided good rear axle stability and oversteer behavior. The aramid ply construction showed, in either right rear or right front deflated operation, an overall improvement of the stearing/handling performance compared to the two rayon ply construction.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic radial two-ply runflat tire having a tread, two inextensible annular beads, two sidewalls, an inner liner, a belt structure located between the tread and a carcass, the latter comprising a radial ply structure consisting of a first radial ply and a second radial ply that are separated in each sidewall by respective axially outermost sidewall wedge inserts, and a second set of axially inward disposed sidewall wedge inserts disposed between the inner liner and the first ply, the tire being characterized by:

the first ply being reinforced with a nonmetallic material having a tensile modulus of elasticity of between about 4 GPa and about 30 GPa, and a specific gravity in the range of between about 1 and about 3;

the second ply being reinforced with an aramid material having a tensile modulus of elasticity in the range of between about 20 GPa and about 80 GPa;

the second ply being prestressed in tension such that the second ply has a greater modulus of elasticity than the first ply; and the first ply being a floating ply but the second ply being clamped around the respective beads such that turnup ends of the second ply are located radially outward of the beads.

2. The tire of claim 1 in which the nonmetallic reinforcing material of the first ply has a specific gravity of between about 1 and about 2.

3. The tire of claim 1 in which the nonmetallic reinforcing material of the first ply has a tensile modulus of elasticity in the range of between about 6 GPa and about 12 GPa and the aramid reinforcing material of the second ply has a tensile modulus of elasticity in the range of between about 25 GPa and about 40 GPa.

* * * * *